(12) United States Patent
Namou et al.

(10) Patent No.: US 10,283,982 B2
(45) Date of Patent: May 7, 2019

(54) VOLTAGE DISCONNECT ARCHITECTURE

(71) Applicant: GM GLOBAL TECHNOLOGY OPERATIONS LLC, Detroit, MI (US)

(72) Inventors: Andrew J. Namou, West Bloomfield, MI (US); Mohammad N. Anwar, Van Buren Township, MI (US); Syed M. Kadry, Grand Blanc, MI (US); Ahmad Albanna, Dearborn Heights, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 562 days.

(21) Appl. No.: 15/007,688

(22) Filed: Jan. 27, 2016

(65) Prior Publication Data

US 2017/0214258 A1    Jul. 27, 2017

(51) Int. Cl.
*H02H 7/18* (2006.01)
*H02J 7/00* (2006.01)
*H02H 3/087* (2006.01)
*H02H 3/20* (2006.01)

(52) U.S. Cl.
CPC .......... *H02J 7/0031* (2013.01); *H02H 3/087* (2013.01); *H02H 7/18* (2013.01); *H02H 3/207* (2013.01); *H02J 2007/0039* (2013.01)

(58) Field of Classification Search
CPC .. H02H 3/08; H02H 3/087; H02H 7/18; H02J 7/0031; H02J 2007/0039
See application file for complete search history.

(56) References Cited

U.S. PATENT DOCUMENTS

| 5,576,612 | A | * | 11/1996 | Garrett | H01M 10/42 320/106 |
| 2010/0026429 | A1 | * | 2/2010 | Roessler | H01H 9/542 335/201 |
| 2010/0259856 | A1 | * | 10/2010 | Senriuchi | H02H 3/066 361/49 |
| 2014/0152261 | A1 | * | 6/2014 | Yamauchi | B60L 11/1866 320/118 |
| 2014/0239896 | A1 | * | 8/2014 | Takeshita | H02J 7/0024 320/117 |
| 2015/0037656 | A1 | * | 2/2015 | Noda | H01M 10/441 429/149 |
| 2015/0137618 | A1 | * | 5/2015 | Vaajala | H02H 3/0935 307/116 |

(Continued)

*Primary Examiner* — Ronald W Leja
*Assistant Examiner* — Christopher J Clark
(74) *Attorney, Agent, or Firm* — Quinn IP Law

(57) ABSTRACT

A disconnect architecture for use with a system having a battery pack and positive and negative bus rails includes a mid-pack low-power (LP) relay, a fuse, semiconductor switches, and a sequencer circuit. The mid-pack LP relay is positioned between the rails at a mid-stack point of the battery pack, and divides a voltage across the battery pack when commanded open. The fuse is positioned between the mid-pack LP relay and the positive bus rail, and opens in response to a dead short condition of the system. The semiconductor switches are positioned in electrical parallel with the mid-pack LP relay. The sequencer circuit selectively turns on the semiconductor switches and thereby coordinates a flow of electrical current through the semiconductor switches and the mid-pack LP relay in response to a detected partial short condition of the system. A system includes the battery pack, bus rails, and disconnect architecture.

20 Claims, 5 Drawing Sheets

(56) References Cited

U.S. PATENT DOCUMENTS

| | | | |
|---|---|---|---|
| 2016/0036252 A1* | 2/2016 | Peterswerth | H02J 7/0021 |
| | | | 320/118 |
| 2016/0231382 A1* | 8/2016 | Hirose | G01R 31/3277 |
| 2016/0254687 A1* | 9/2016 | Tanaka | H02J 7/045 |
| | | | 320/112 |
| 2017/0141592 A1* | 5/2017 | Snyder | H02H 3/08 |
| 2017/0345600 A1* | 11/2017 | Naumann | H01H 71/40 |

* cited by examiner

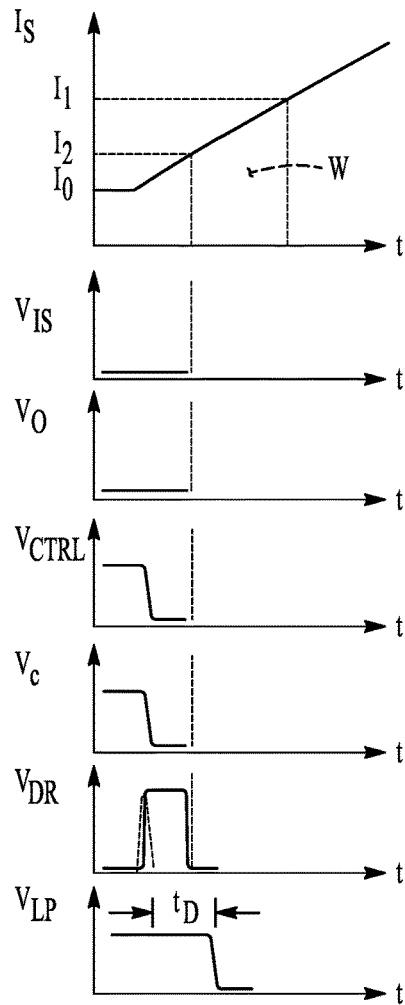
Fig-5B
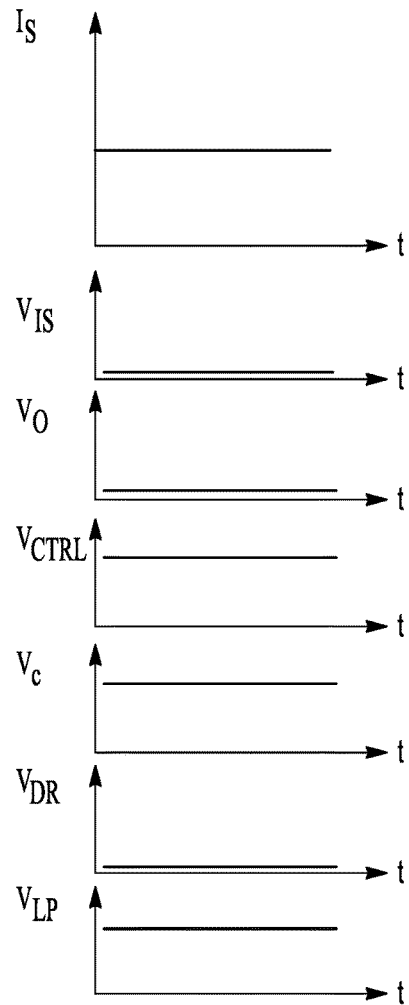
Fig-5C
| $V_{SH}$ | $V_{PC}$ | SS |
|---|---|---|
| H | H | S2/INT |
| H | L | S3/1 |
| L | L | S1/0 |
| L | H | S1/0 |
Fig-6

VOLTAGE DISCONNECT ARCHITECTURE

TECHNICAL FIELD

The disclosure pertains to a voltage disconnect architecture.

BACKGROUND

Battery packs are used in various stationary and mobile systems to power one or more electric machines and electronic devices. Electric motor generator units are one type of electric machine that is commonly used to provide or store electrical energy in a system. For instance, an electric motor/generator unit may draw electrical energy from the battery pack in order to deliver torque to one or more gear sets or other rotating members of a power transmission. Such motor/generator units may also be used to generate rather than consume electricity, and thereby recharge the battery pack or power the electronic devices.

Because voltage levels suitable for use in certain applications can be relatively high, voltage isolation is required in any electrical circuit used to connect the battery pack to the remainder of the system. Typically, a battery disconnect unit is used that includes high-power fuses and high-voltage mechanical contactors to isolate the DC voltage bus from the battery pack and provide galvanic isolation when the system is turned off or during an electrical fault. However, the size, weight, and cost of high-voltage contactors and fuses may be less than optimal.

SUMMARY

The present disclosure pertains to a voltage disconnect architecture, i.e., a system and an accompanying implementation thereof, for mechanizing a voltage disconnect process, which is of particular importance when used in systems having relatively high voltage levels. The architecture reduces the need for heavy-duty mechanical contactors of the types noted above. The architecture also eliminates the need for a pre-charge resistor to initially charge the DC bus rails to a required voltage level. As is well known in the art, a pre-charge resistor is typically connected in series with a contactor or other mechanical switch, both of which are placed in electrical parallel with another mechanical contactor. The pre-charge resistor provides sufficient resistance in the electrical circuit so as to prevent a large voltage difference and a high inrush current from the battery pack, both of which can potentially damage or weld the contactors. Thus, the added cost and size of the pre-charge circuit can be eliminated via the structure and methodology disclosed herein.

A particular embodiment of the disconnect architecture is disclosed for use with a system having a battery pack, a positive bus rail, and a negative bus rail. The architecture includes a pack fuse and a mid-pack low-power (LP) relay positioned between the positive and negative bus rails at or near a mid-stack point of the battery pack, with the LP relay positioned between the pack fuse and the negative bus rail. The mid-pack LP relay, which is a high-voltage/current LP relay, is strategically placed in conjunction with the pack fuse so as to divide a voltage across the battery pack when the mid-pack LP relay is commanded open. The disclosed architecture also includes a pair of semiconductor switches positioned in electrical parallel with the mid-pack LP relay. Additionally, a sequencer circuit is configured to coordinate a flow of electrical current through the semiconductor switches and the mid-pack LP relay in response to a detected partial short condition of the system, e.g., an overcurrent or emergency non over-current condition as described herein.

The disconnect architecture may include a pair of high-current/LP relays each positioned on a respective one of the positive and negative bus rails. The LP relays can selectively open to provide galvanic isolation in the system, e.g., when the system is turned off.

A system is also disclosed that includes a battery pack having a plurality of cells, positive and negative bus rails, and the disconnect architecture noted above.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

FIGS. 5A-C are time plots of various voltage and current amplitudes illustrating example fault conditions in the form of over-current, emergency non over-current, and normal propulsion/charging scenarios, respectively.

FIG. 6 is a table describing three possible logic states for the driver circuit of FIG. 4.

DETAILED DESCRIPTION

Figure 1:
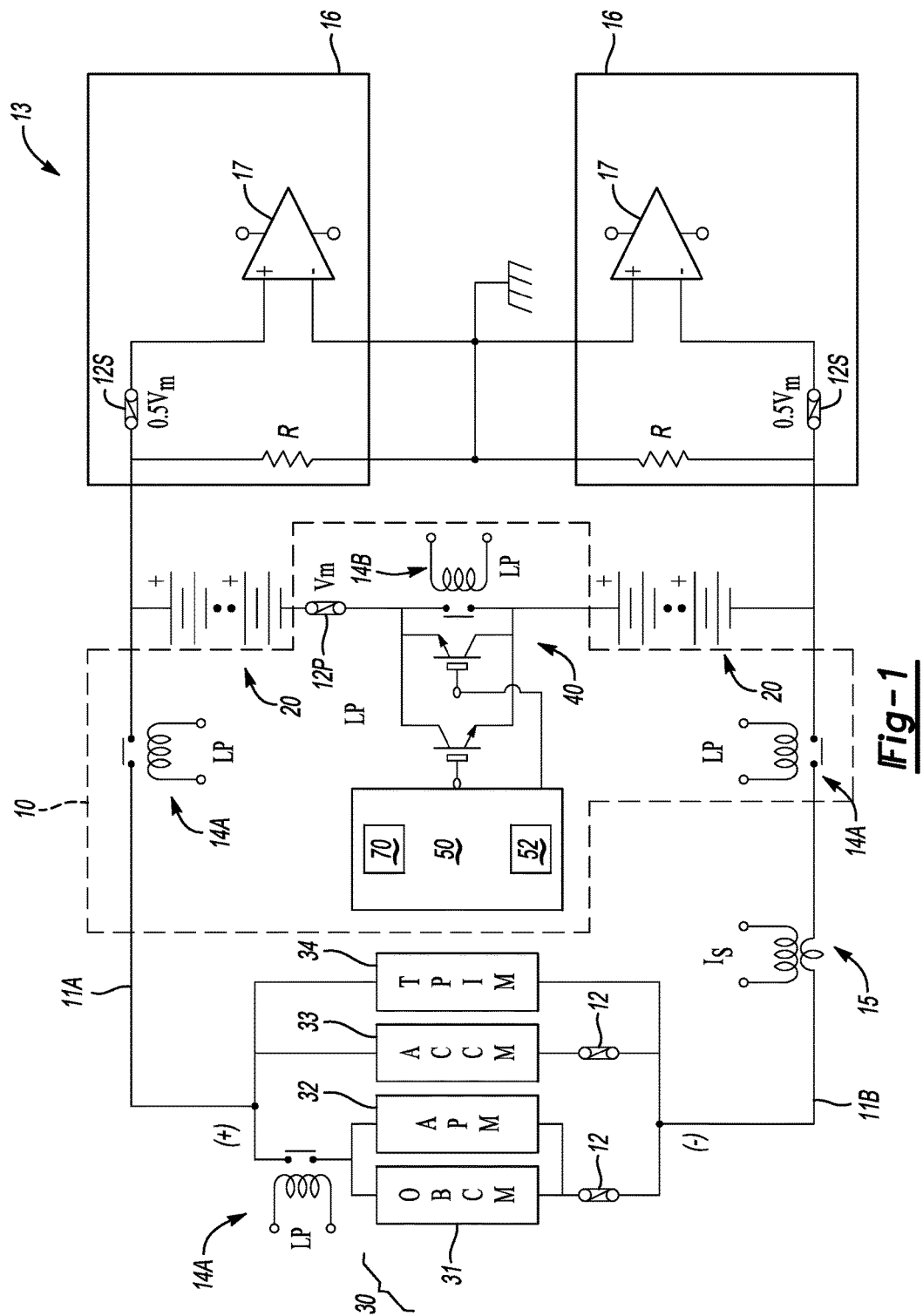
FIG. 1 is a schematic electrical circuit describing an example embodiment of a disconnect architecture as set forth herein.
Figure 2:
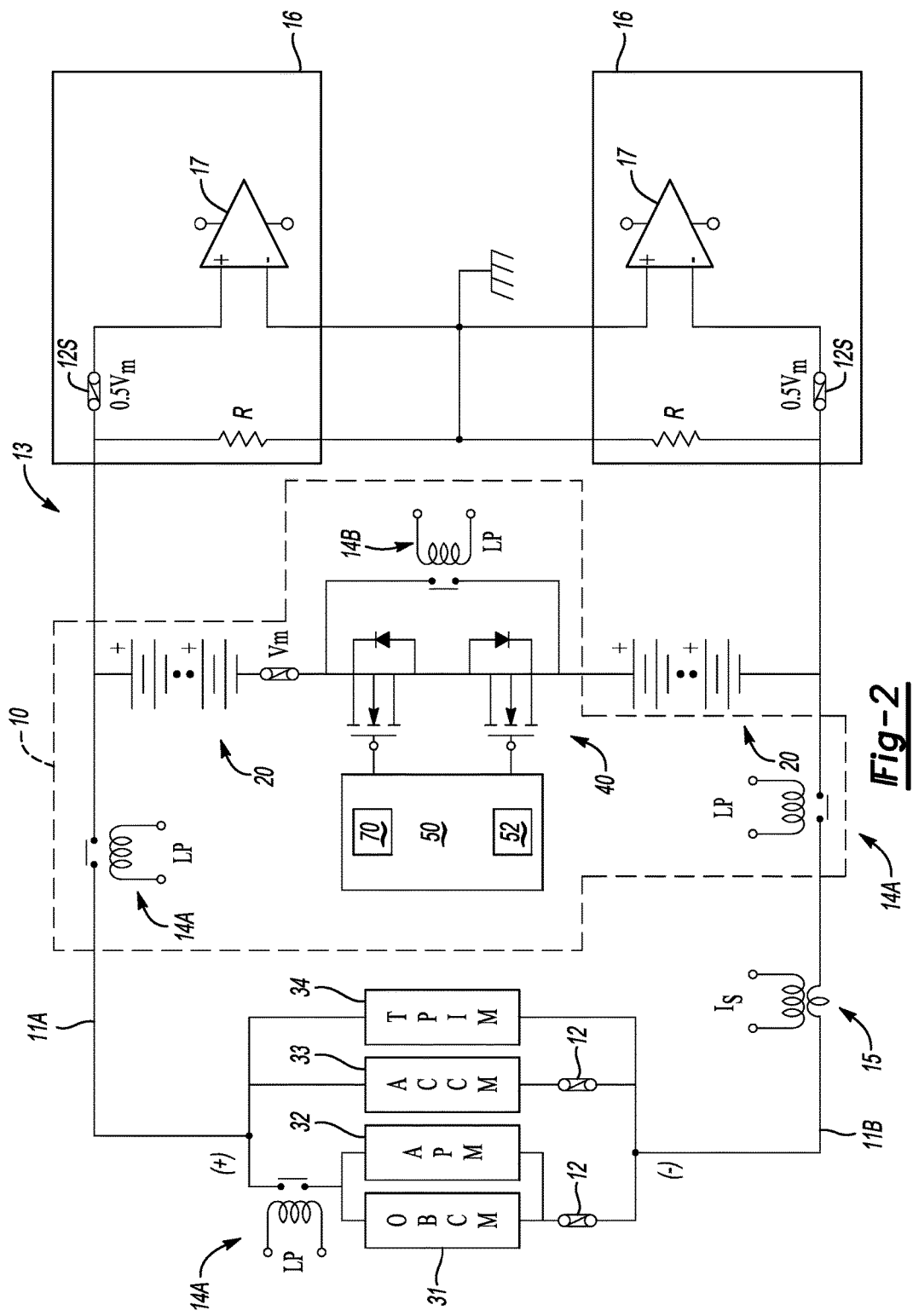
FIG. 2 is a schematic electrical circuit describing the disconnect architecture of FIG. 1 according to another embodiment.

Referring to the drawings, wherein like numerals indicate like components throughout the several views, an example voltage disconnect architecture 10 is depicted schematically in FIGS. 1 and 2. The disconnect architecture 10 may be used as part of a system 13 that also includes a battery pack 20 and a voltage bus having positive (+) and negative (−) bus rails 11A and 11B, respectively. The battery pack 20 may be embodied as a multi-cell lithium ion, nickel metal hydride, or other rechargeable battery pack. As contemplated herein, the DC voltage level of the voltage bus may be relatively high, e.g., above 200 VDC, without limiting the voltage levels to such levels.

The disconnect architecture 10 may include a pair of high-current/low-power (LP) relays 14A, each positioned on a respective one of the bus rails 11A and 11B, as well as a high-voltage/LP relay 14B positioned at or near a mid-stack point of the battery pack 20 as shown. For clarity, and to differentiate from the optional additional LP relays 14A located on the bus rails 11A and 11B, the LP relay 14B is referred to hereinafter as the mid-pack LP relay 14B. A current sensor 15 may be used to determine a sensed electrical current ($I_S$) flowing in the depicted circuit. As used herein, the terms "high" and "low" are used to qualify the terms "current", "voltage", and "power", and are intended to be relative to typical auxiliary or low-voltage/current levels. In a non-limiting example embodiment, e.g., when the battery pack 20 is used to power an electric machine such as a traction motor aboard a vehicle or within a power plant, an example power threshold for a high-power application is about 100 kW or higher.

The disconnect architecture 10 of FIGS. 1 and 2 includes a pair of parallel semiconductor switches 40. The semiconductor switches 40, which may be positioned in an anti-series arrangement as shown, i.e., with opposite relative polarity, may be embodied as an IGBT switching pair as shown in FIG. 1, a MOSFET switching pair as shown in FIG. 2, or as a WBG switching pair (not shown) or other suitable semiconductor switching pair. The semiconductor switches 40 are positioned in electrical parallel with the mid-pack LP relay 14B. That is, if the battery pack 20 has 192 cells, the semiconductor switches 40 may be positioned between the $96^{th}$ and $97^{th}$ cells. A pack fuse 12P rated for the full voltage of the battery pack 20 is positioned between the semiconductor switches 40 and the positive bus rail 11A, i.e., right above the semiconductor switches 40. Such a pack fuse 12P, as well as other fuses 12 and 12S located in the disconnect architecture 10, is configured to open in the event of a dead short, independent of any control operation of the semiconductor switches 40 and the mid-pack LP relay 14B.

As described below with reference to FIGS. 3 and 4, for fault conditions other than a dead short condition, switching operation of the semiconductor switches 40 is closely coordinated in logic with operation of the pack fuse 12P and the mid-pack LP relay 14B. That is, control of the semiconductor switches 40 is calibrated so as to cover fault zones below set limits of the pack fuse 12P. Fine control is thus enabled over low current and/or high resistance shorts, leaving the pack fuse 12P to handle any dead short conditions. In this manner, the pack fuse 12P does not have to be sized for a large window of currents or loads in the usual manner.

The disconnect architecture 10 also includes, or is connected to, conventional isolation detection circuits 16 having fuses 12S, current-limiting resistors R, and isolated differential amplifiers 17 of the types known in the art, which collectively detect proper voltage isolation. Because of the use of the pack fuse 12P and the semiconductor switches 40 at the mid-stack point of the battery pack 20, the voltage rating of the fuses 12S used in the isolation detection circuits 16 may be reduced to half of their normal maximum voltage rating ($V_m$), as indicated in FIGS. 1 and 2 by the notation $0.5V_m$.

The disconnect architecture 10 is intended to provide a number of distinct performance advantages relative to prior art battery disconnect systems. Specifically, the disconnect architecture 10 enables a voltage level across the bus rails 11A and 11B to be divided in half during a shut-off mode of any system using the disconnect architecture, e.g., an ignition off/key-off event in a vehicle. This in turn allows the rating of the fuses 12S to be reduced to 50% of their typical maximum-rated value, while also reducing the electrical potential and current flowing in the disconnect architecture 10 during any electrical faults. Additionally, the pack fuse 12P can be sized to provide maximum current protection, with its isolation function closely coordinated with operation of the semiconductor switches 40 so as to allow for proper zoning protection during resistive shorts, as well as to provide for additional hardware optimization. Moreover, pre-charging of the bus rails 11A and 11B or of any link capacitor(s) (not shown) is enabled without the use of a conventional pre-charge resistor, with internal short circuit protection always maintained during normal operation of any system utilizing the disconnect architecture 10.

The battery pack of FIGS. 1 and 2 may be used to power an electrical system 30. In a non-limiting example embodiment, the electrical system 30 may include a plurality of electronic components, including for instance an onboard charging module (OBCM) 31, an auxiliary power module (APM) 32, an air conditioning control module (ACCM) 33, and/or a power inverter module (PIM) 34. Additional fuses 12 and another high-current/low-power relay 14A may be used to protect the components in the usual manner.

As is known in the art, the OBCM 31 may be plugged into an external polyphase/alternating current (AC) power supply to charge the battery pack 20 when the disconnect architecture 10 is used as part of a vehicle that is parked at a charging station or in a garage. The APM 32 may be embodied as a voltage regulator operable for reducing the DC voltage level to auxiliary levels, e.g., 12-15 VDC. The ACCM 33 may be used to control an air conditioning compressor (not shown) and other climate control functions. The PIM 34 may be a power inverter device having the requisite semiconductor switches and devices needed for converting an AC voltage input into a DC voltage output and vice versa, e.g., via pulse width modulation or other suitable switching techniques. Such example components, or other electronic components not shown in the simplified example embodiments of FIGS. 1 and 2, may provide other high-voltage functions within or in conjunction with the disconnect architecture 10 described herein.

The disconnect architecture 10 of FIGS. 1 and 2 also includes a sequencer circuit 50 operable for controlling the overall switching operation of the semiconductor switches 40. As described below in more detail with reference to FIG. 3, the sequencer circuit 50 may include a window comparator circuit 52 and a driver circuit 70 operable for providing semi-automatic, electronic, and fully resettable disconnect functionality within the disconnect architecture 10. Moreover, handling of any electrical current above a threshold current rating of the semiconductor switches 40 is electrically coordinated with the operation of the fuses 12 and 12P via operation of the sequencer circuit 50 to provide short circuit/high-power protection. Electrical coordination allows for calibrated zoning protection, i.e., a resettable disconnect functionality is enabled.

Figure 3:
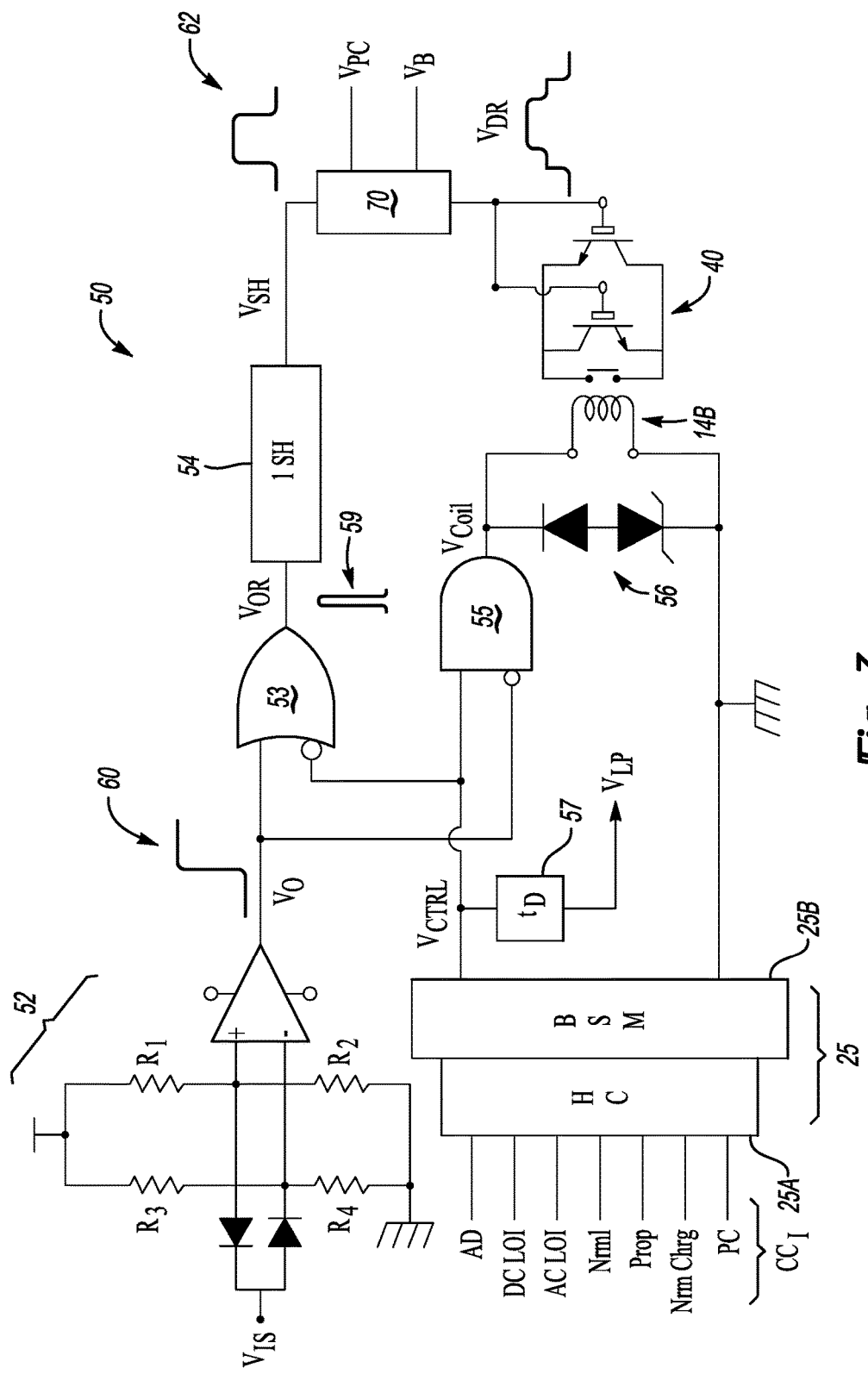
FIG. 3 is a schematic electrical circuit for a sequencer circuit that may be used as part of the disconnect architecture shown in FIGS. 1 and 2.

A non-limiting example embodiment of the sequencer circuit 50 is shown schematically in FIG. 3. The sequencer circuit 50 is operable for generating an output voltage in response to a predetermined fault, such as a detected partial short condition. In particular, the window comparator circuit 52 is configured to automatically distinguish the current level relative to the zoning calibration thresholds, which in turn control the timing of the semiconductor switches 40 and the mid-pack LP relay 14B at the mid-stack point. In the event of a dead short condition, i.e., when a short-circuit path has zero or near-zero resistance, the semiconductor switches 40 remain off, and the pack fuse 12P and LP relays 14A on the bus rails 11A and 11B open so as to disconnect the battery pack 20. In the absence of a dead short condition, however, such as in the presence of a resistive short or overcurrent condition that still lies within the current capability of the semiconductor switches 40, the window comparator circuit 52 can automatically determine precisely when to open the semiconductor switches 40, and to shuttle current between the semiconductor switches 40 and the mid-pack LP relay 14B.

In the event of a short circuit, the semiconductor switches 40 are "smart" enough to remain off. The main pack fuse 12P is the high-power disconnect device. The relays 14A serve as further galvanic isolation. The LP relays 14A, because they open only after the main pack fuse 12P, can be cost-reduced into low-power designs relative to convention configurations, as the LP relays 14A are not required to break the high-power circuit. In a short event, the LP relays 14A can open to isolate the rails 11A and 11B. However, those of ordinary skill in the art will appreciate that as the center of the battery pack 20 is disconnected by operation of the pack fuse 12P, embodiments may be realized that forego the use of the LP relays 14A altogether.

The window comparator circuit 52 can be tuned to a desired performance via the resistance levels of its resistors $R_1$, $R_2$, $R_3$, and $R_4$ and by knowing the sensed voltage ($V_{IS}$). If the value of the sensed voltage ($V_{IS}$) falls within a calibrated window, the semiconductor switches 40 may be signaled to open via transmission of an output voltage ($V_O$), as indicated by the step signal 60 shown in FIG. 3. The output voltage ($V_O$) of the window comparator circuit 52 is transmitted to an OR logic gate 53, the binary logic output of which, i.e., $V_{OR}$, is output as a pulse signal 59 to a monostable one-shot circuit (1 SH) 54. As is well known in the art, such a one-shot circuit has a state that is stable and another state that is unstable but transient. The output voltage ($V_O$) of the window comparator circuit 52 thus acts as a trigger that causes the one-shot circuit 54 to enter its transient/unstable state for a set amount of time before returning to its stable state. The one-shot circuit 54 outputs a one-shot binary signal ($V_{SH}$) as another pulse signal 62. The one-shot binary signal ($V_{SH}$) is transmitted to the driver circuit 70 noted above, an embodiment of which is described below with reference to FIG. 4.

The OR logic gate 53 of FIG. 3 has another input in the form of a control voltage, which may be provided from a control module 25. For instance, the control module 25 in an example vehicle embodiment may include a hybrid controller 25A and a battery system manager (BSM) 25B. The hybrid controller 25A and/or the battery system manager 25B may receive a plurality of input signals ($CC_I$). Example input signals ($CC_I$) may include current/voltage arc detection signal (AD), DC and AC loss of isolation signals (DC LOI and AC LOI), and other status signals such as normal operation (NRML), propulsion mode detection (PROP), commanded normal charging of the battery pack 20 (NRM CHRG), and a commanded pre-charging of the battery pack (PC). The manner in which such signals are determined is conventional in the art, e.g., determined in logic of the control module 25 in response to detected conditions or calculated values as a part of the operation of the architecture 10.

Based on these collective inputs, the control voltage ($V_{CNTL}$) is output as a binary value to an AND logic gate 55. A high output value of the AND logic gate 55 is the default output during normal operation of the disconnect architecture 10, which coincides with the semiconductor switches 40 remaining open/non-conducting. A diode pair 56, e.g., a conventional diode arranged back-to-back with a zener diode as shown, is connected in parallel with the mid-pack LP relay 14B described above. The output of the AND logic gate 55 thus controls the level of the coil voltage ($V_C$) (labeled $V_{Coil}$ in FIG. 3), and thus controls operation of the mid-pack LP relay 14B.

When the control voltage ($V_{CTRL}$) is low/0, however, the opposite result occurs. No electrical current flows through the mid-pack LP relay 14B, thereby alleviating the current load on the mid-pack LP relay 14B. This result in turn allows the mid-pack LP relay 14B to be reduced in size and cost. Once the semiconductor switches 40 close, the other LP relays 14A shown in FIGS. 1 and 2, all of which remain independently-controllable, can open in response to the control voltage ($V_{CTRL}$) after a short delay.

To achieve the desired ends, the control voltage ($V_{CTRL}$) may be fed into a delay block 57 ($t_d$), such as a simple RC circuit. A delayed control voltage ($V_{LP}$) is output from the delay block 57 to the LP relays 14A on the DC bus rails 11A and 11B shown in FIGS. 1 and 2. In this manner, operation of the semiconductor switches 40 can be coordinated so as to act as a DC fuse, with close electrical coordination with operation of the various LP relays and fuses of the disconnect architecture 10.

Figure 4:
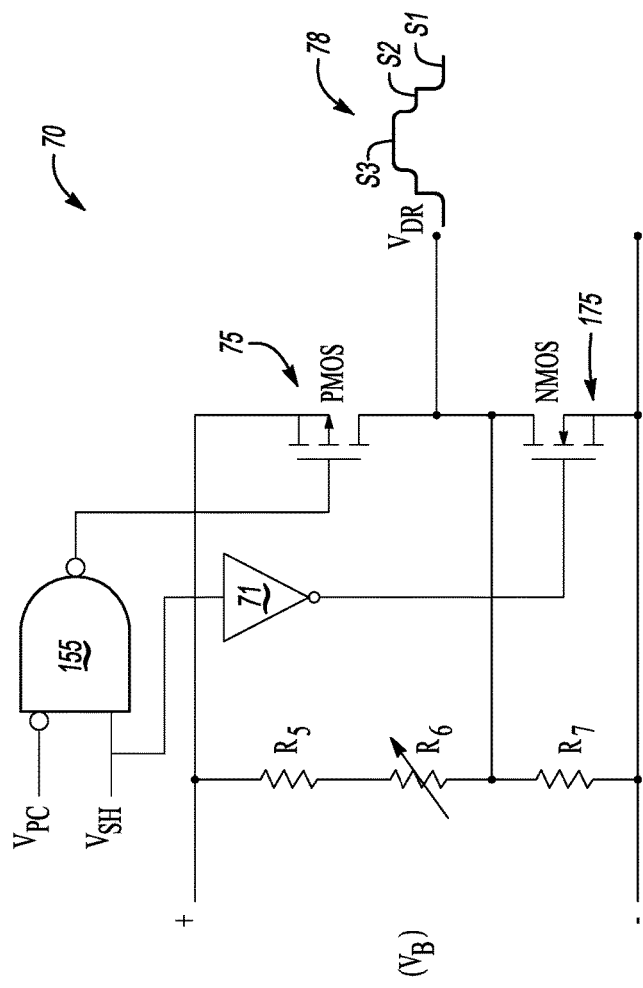
FIG. 4 is a schematic three-gate driver circuit usable as part of the disconnect architecture shown in FIGS. 1 and 2.

The driver circuit 70 of FIG. 3, which is fed with a pre-charge voltage signal ($V_{PC}$) and a biasing voltage ($V_B$) and outputs a driving voltage ($V_{DR}$) in one of three possible states, is shown in further detail in FIG. 4. This particular circuit element receives three inputs: the output voltage of the one-shot circuit 54 ($V_{SH}$), the pre-charge voltage signal ($V_{PC}$), and the biasing voltage ($V_B$). When pre-charging of the voltage bus is required, a binary pre-charge voltage signal ($V_{PC}$) of 1 or another high/non-zero value is commanded by the control module 25 shown in FIG. 3 or another suitable controller. The pre-charge voltage signal ($V_{PC}$) is fed into another AND logic gate 155 along with the voltage output ($V_{SH}$) of the one-shot circuit 54 of FIG. 4. The output of the AND logic gate 155 is provided as a first gate voltage (VG1) to a first three-level logic gate 75, e.g., a p-channel MOSFET (PMOS) of the type known in the art. The output of the one-shot circuit 54 ($V_{SH}$) is also inverted via a logic inverter 71 and fed as a second gate voltage (VG2) into another three-level logic gate 175 in the form of an n-channel MOSFET or NMOS.

With respect to the three-level logic gates 75 and 175, corresponding gate voltages $V_{G1}$ and $V_{G2}$ from the AND logic gate 155 turn the logic gates 75 and 175 on or off as needed, and thereby produce a waveform 78 having one of three possible logic states S1, S2, or S3. As is known in the art, when a gate voltage supplied to a logic gate such as the logic gates 75 and 175 of FIG. 4 is higher than a calibrated threshold voltage, the logic gate turns on and reaches the logic state S3, i.e., a high or 1. The logic gate 75 or 175 turns off to achieve logic state S1, which is low or 0, below such a voltage threshold. However, at or near the voltage threshold the logic gate 75 or 175 is partially on, thereby achieving an intermediate logic state S2 between 0 and 1. When partially on, coordination occurs between the semiconductor switches 40 and the LP relay 14B.

For the logic gate 75 embodied as a PMOS, turning on the logic gate 75 and turning off the logic gate 175 causes only the PMOS to conduct. The logic gate 75 can be turned off and the logic gate 175 turned on to cause only the NMOS to conduct. When both logic gates 75 and 175 are turned off, the logic state can be controlled via a variable resistor $R_6$, with other resistors $R_5$ and $R_7$ calibrated and fixed to provide the desired response.

Referring briefly to FIG. 6, which depicts the voltage output ($V_{SH}$) of the one-shot circuit 54, the pre-charge voltage signal ($V_{PC}$), and the switching state (SS) resulting from a particular combination of high (H) and low (L) values in the circuit 70 of FIG. 4, when the voltage output ($V_{SH}$) of the one-shot circuit 54 of FIG. 3 goes high (H), the logic gate 175 of FIG. 4 turns off/goes low. When pre-charging is not required, $V_{PC}$ is sent high, e.g., by the control module 25. In this instance, the driver circuit 70 acts as a resistor so as to achieve the intermediate state S2, with operation of the semiconductor switches 40 in state S2 coordinated with the operation of the mid-pack LP relay 14B to reduce the current load on the LP relay 14B.

If the voltage output ($V_{SH}$) of the one-shot circuit 54 is commanded high and the pre-charge voltage ($V_{PC}$) is commanded low (L), the high logic state S3 is provided and the semiconductor switches 40 are turned on. Pre-charging of the bus rails 11A and 11B is enabled. However, when the output ($V_{SH}$) of the one-shot circuit 54 is low (L), the low logic state S1 is provided, regardless of the high/low state of the pre-charge voltage ($V_{PC}$). With the output ($V_{SH}$) low, the logic gate 175 of FIG. 4 is turned on regardless of the state of the pre-charge signal ($V_{PC}$).

Figure 5A:
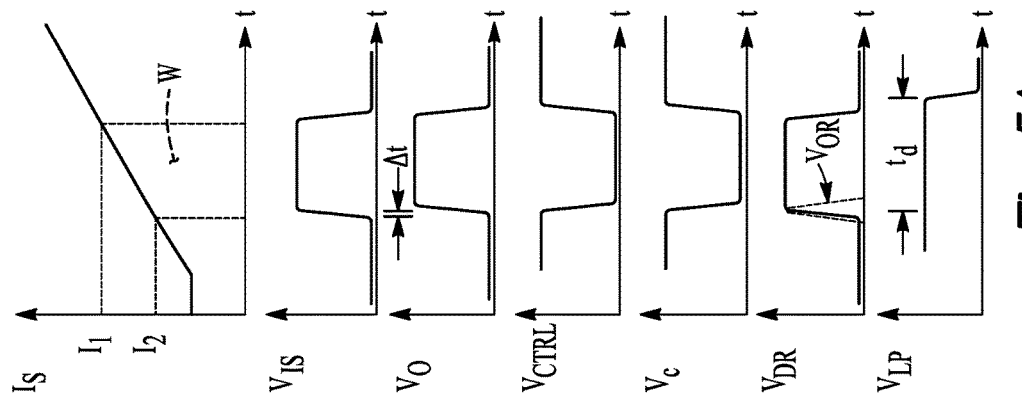

FIGS. 5A-C describe example overcurrent, emergency non-overcurrent, and normal propulsion/charging scenarios, respectively, with time (t) plotted on the horizontal axes of each Figure and the amplitude of a given measured parameter depicted on each vertical axis. Each of FIGS. 5A-C depict parameters from the disconnect architecture 10 of FIG. 1, including the sensed or calculated current ($I_S$) across the current sensor 15 of FIGS. 1 and 2, the sensed or calculated voltage ($V_{IS}$) from the isolation detection circuits 16, and the output ($V_O$) of the window comparator 52 shown in FIG. 3. Additional parameters include the control voltage ($V_{CTRL}$), the coil voltage ($V_C$), the output voltage ($V_{DR}$) from the driver circuit 70 shown in FIG. 4, and the delayed control voltage ($V_{LP}$) for the LP relays 14A that is output from the delay block 57 shown in FIG. 3.

For the example overcurrent condition of FIG. 5A, a control window (W) is established by configuration of the window comparator 52 as explained above. Sensed current ($I_S$) detected above a first threshold ($I_1$) can indicate a dead short condition, while a sensed current ($I_S$) below a lower second threshold ($I_2$) can indicate no short. Within the window (W), the output ($V_O$) of the window comparator 52 of FIG. 3 rises in response to detection of a threshold sensed voltage ($V_{IS}$), with the short delay due to processing by the window comparator 52 indicated as Δt.

The value of the control voltage ($V_{CTRL}$) goes low or drops to 0 in response to the detected overcurrent condition by operation of the controller 25. The output voltage ($V_{DR}$) from the driver circuit 70 shown in FIG. 4 at the same time goes high, and is transmitted to the semiconductor switches 40. As noted above, this action ultimately causes the semiconductor switches 40 to close, and therefore, no current flows through the LP relay 14B, a result that is indicated by the zero coil voltage ($V_C$). A calibrated amount of time ($t_D$) later, the delayed control voltage ($V_{LP}$) follows, and is transmitted to the LP relays 14A of FIGS. 1 and 2, thereby causing the LP relays 14A to open for additional galvanic isolation.

For the example emergency, non over-current condition of FIG. 5B, using the same control window (W) of the window comparator 52 as set forth above, the control voltage ($V_{CTRL}$) drops to 0 at a lower current level, $I_0$, in response to the detected condition. The output voltage ($V_{DR}$) from the driver circuit 70 shown in FIG. 4 goes high and is transmitted to the semiconductor switches 40. This ultimately causes the semiconductor switches 40 to close, and therefore, current will flow through the mid-pack LP relay 14B for only a portion of the duration of the condition before the semiconductor switches 40 close. A calibrated amount of time ($t_D$) later, the delayed control voltage ($V_{LP}$) would follow, and is transmitted to the LP relays 14A of FIGS. 1 and 2, causing the LP relays 14A to open as is the case in FIG. 5A.

FIG. 5C depicts a normal operating condition in which the architecture 10 of FIGS. 1 and 2 experiences no fault. The sensed current ($I_S$) stays level and the sensed voltage ($V_{IS}$) stays low, indicating normal operation and current draw from the battery pack 20. In this condition, the output ($V_O$) of the window comparator 52 remains low and the control voltage ($V_{CTRL}$) remains high. As a result, the coil voltage ($V_C$) across the mid-pack LP relay 14B at the mid-stack point of the battery pack 20 stays high, such that the full maximum voltage of the battery pack 20 is available to power the electrical system 30. Unlike the conditions of FIGS. 5A and 5B, the output voltage ($V_{DR}$) from the driver circuit 70 shown in FIG. 4 remains low in the absence of a fault. As a result, the semiconductor switches 40 remain open, and all current flows through the mid-pack LP relay 14B.

Thus, the disconnect architecture 10 of FIGS. 1 and 2 as described with reference to FIGS. 3-5C optimizes mechanization of a voltage bus with reduced cost and mass relative to existing solutions, doing so without sacrificing disconnect robustness or adding to design complexity. Along with the benefits noted above, the disconnect architecture 10 may reduce transient high-current and voltage ratings on HV contactors by introducing solid-state switches, i.e., the semiconductor switches 40, and smaller, more economical relays in place of heavy-duty mechanical contactors. Dual-rail galvanic isolation is maintained at minimal cost, and when used aboard a vehicle, independent control of the various LP relays 14A and 14B by the control module 25 or other dedicated controller is always maintained.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A disconnect architecture for use with a system having a battery pack, a positive bus rail, and a negative bus rail, the disconnect architecture comprising:
   a mid-pack low-power (LP) relay positioned between the positive and negative rails at a mid-stack point of the battery pack, wherein the mid-pack LP relay is operable to create an open circuit between series-connected cells of the battery pack when commanded open;
   a pack fuse positioned between the mid-pack LP relay and the positive bus rail, and configured to open in response to a dead short condition of the system;
   a pair of semiconductor switches positioned in electrical parallel with the mid-pack LP relay; and
   a sequencer circuit configured to selectively turn on the semiconductor switches and thereby coordinate a flow of electrical current through the semiconductor switches and the mid-pack LP relay in response to a detected partial short condition of the system.

2. The disconnect architecture of claim 1, wherein the semiconductor switches are positioned in an anti-series arrangement.

3. The disconnect architecture of claim 1, wherein the sequencer circuit includes a window comparator circuit having a differential amplifier, a pair of diodes, and a plurality of resistors, and wherein the window comparator circuit is operable for generating an output voltage in response to the detected partial short condition.

4. The disconnect architecture of claim 1, wherein the sequencer circuit includes a driver circuit, the driver circuit having a pair of transistors together configured to output a driving voltage in one of three possible states, such that the pair of transistors together forms a three-level logic gate.

5. The disconnect architecture of claim 4, wherein the pair of transistors includes an NMOS and a PMOS.

6. The disconnect architecture of claim 4, wherein the driver circuit includes a variable resistor, and wherein a logic state output from the driver circuit is controllable via the variable resistor when the pair of three-level logic gates are both turned off.

7. The disconnect architecture of claim 4, further comprising an additional pair of LP relays each positioned on a respective one of the positive and negative rails, and configured to selectively open and thereby disconnect the battery pack from the positive and negative bus rails when the system is turned off.

8. The disconnect architecture of claim 4, wherein the sequencer circuit includes a monostable one-shot circuit operable for outputting a transient pulse signal to the driver circuit in response to the output voltage from the window comparator circuit to thereby turn on the semiconductor switches during the detected partial short condition.

9. The disconnect architecture of claim 1, wherein the disconnect system is characterized by an absence of a pre-charge resistor.

10. A system comprising:
a battery pack having a plurality of cells;
positive and negative bus rails; and
a disconnect architecture having:
a mid-pack low-power (LP) relay positioned between the positive and negative bus rails at a mid-stack point of the battery pack and operable to create an open circuit between series-connected cells of the battery pack when commanded open;
a pack fuse positioned between the mid-pack LP relay and the positive bus rail, and configured to open in response to a dead short condition of the system;
a pair of semiconductor switches positioned in electrical parallel with the mid-pack LP relay; and
a sequencer circuit configured to selectively turn on the semiconductor switches and thereby coordinate a flow of electrical current through the semiconductor switches and the additional LP relay in response to a detected partial short condition of the system.

11. The system of claim 10, further comprising a plurality of electronic components connected between the positive and negative bus rails.

12. The system of claim 11, wherein the plurality of electronic components includes one or more of an onboard charging module, an auxiliary power module, an air conditioning control module, and a power inverter module.

13. The system of claim 10, wherein the semiconductor switches are positioned in an anti-series arrangement.

14. The system of claim 10, wherein the sequencer circuit includes a window comparator circuit having a differential amplifier, a pair of diodes, and a plurality of resistors, and wherein the sequencer circuit is operable for generating an output voltage in response to the detected partial short condition.

15. The system of claim 14, wherein the sequencer circuit further includes a driver circuit, the driver circuit having a pair of transistors together configured to output a driving voltage in one of three possible states, such that the pair of transistors together forms a three-level logic gate.

16. The system of claim 15, wherein the pair of transistors includes an NMOS and a PMOS.

17. The system of claim 15, wherein the sequencer circuit includes a monostable one-shot circuit operable for outputting a transient pulse signal to the driver circuit in response to the output voltage from the window comparator circuit to thereby turn on the semiconductor switches during the detected partial short condition.

18. The system of claim 17, wherein the driver circuit includes a variable resistor, and wherein a logic state output from the driver circuit is controllable via the variable resistor when the pair of three-level logic gates are both turned off.

19. The system of claim 10, wherein the disconnect system is characterized by an absence of a pre-charge resistor.

20. The system of claim 10, further comprising an additional pair of LP relays each positioned on a respective one of the positive and negative rails, and configured to selectively open and thereby disconnect the battery pack from the positive and negative bus rails when the system is turned off.

* * * * *